No. 612,603. Patented Oct. 18, 1898.
J. W. CHAMBERS.
VEHICLE BEARING.
(Application filed Oct. 9, 1897.)

(No Model.) 2 Sheets—Sheet 1.

WITNESSES:
W. G. Shepherd
M. Bury

INVENTOR
John W. Chambers
BY
ATTORNEY.

No. 612,603. Patented Oct. 18, 1898.
J. W. CHAMBERS.
VEHICLE BEARING.
(Application filed Oct. 9, 1897.
(No Model.) 2 Sheets—Sheet 2.
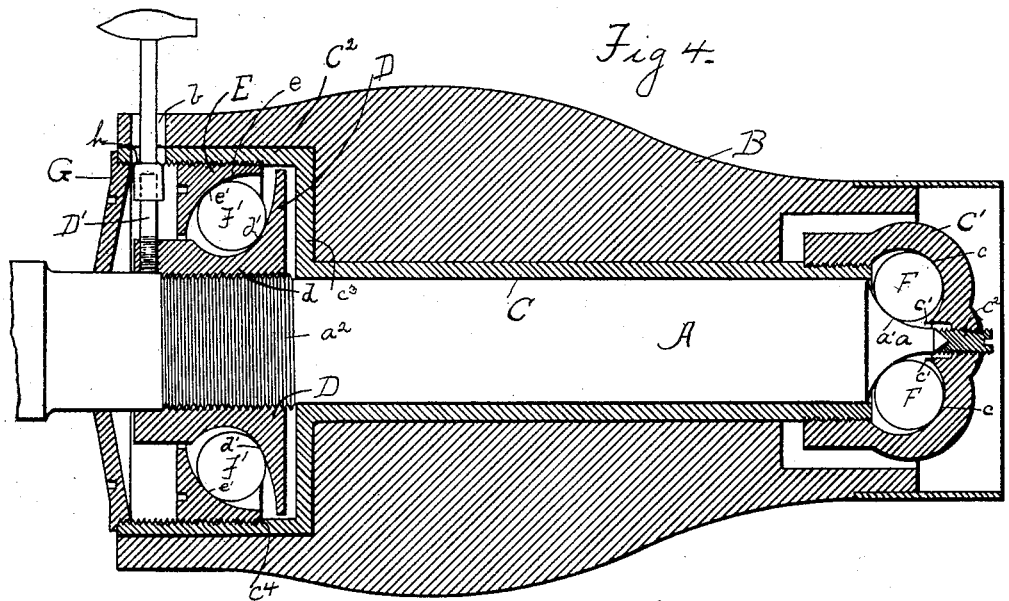
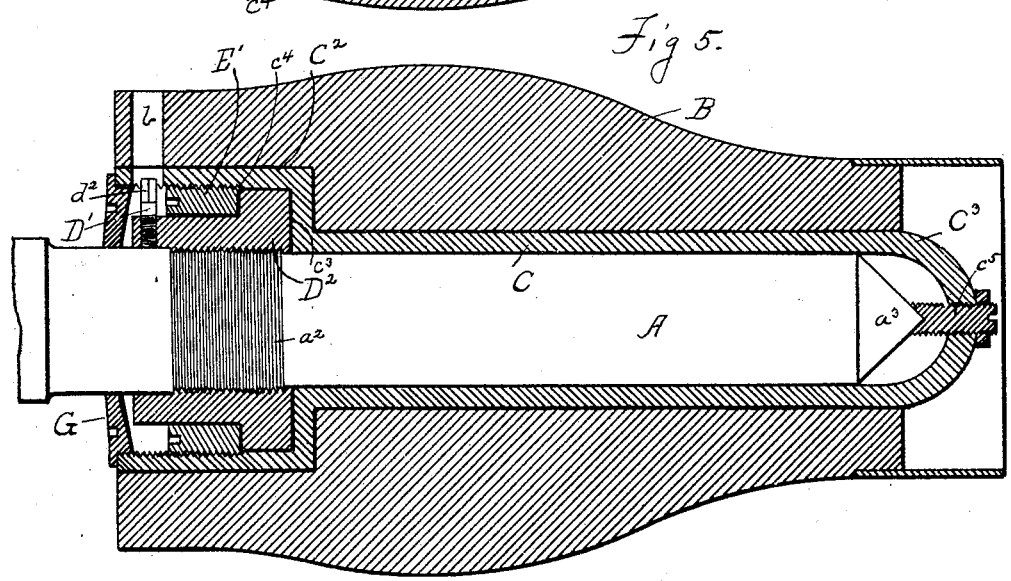
WITNESSES:
INVENTOR
John W. Chambers
BY
ATTORNEY.
THE NORRIS PETERS CO., PHOTO-LITHO., WASHINGTON, D. C.

UNITED STATES PATENT OFFICE.

JOHN W. CHAMBERS, OF FORT ATKINSON, WISCONSIN, ASSIGNOR OF ONE-HALF TO GEORGE W. DEXHEIMER, OF SAME PLACE.

VEHICLE-BEARING.

SPECIFICATION forming part of Letters Patent No. 612,603, dated October 18, 1898.

Application filed October 9, 1897. Serial No. 654,624. (No model.)

*To all whom it may concern:*

Be it known that I, JOHN W. CHAMBERS, a citizen of the United States, residing at Fort Atkinson, in the county of Jefferson and State of Wisconsin, have invented certain new and useful Improvements in Vehicle-Bearings; and I do hereby declare the following to be a full, clear, and exact description of the invention, such as will enable others skilled in the art to which it appertains to make and use the same.

This invention relates to vehicle-bearings; and it consists in certain improvements in the construction thereof, as will be hereinafter fully described, and pointed out in the claims.

Figure 1:
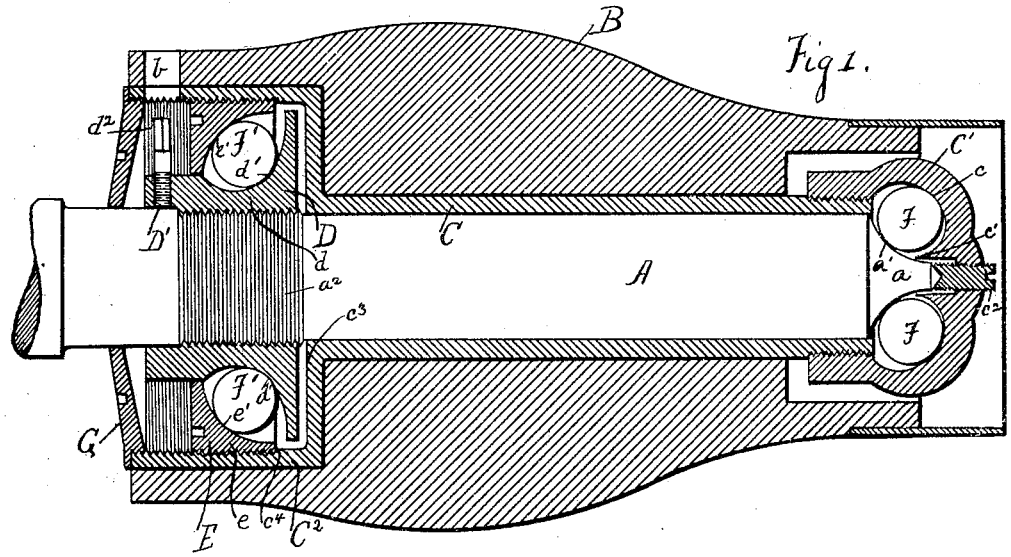
Figure 2:
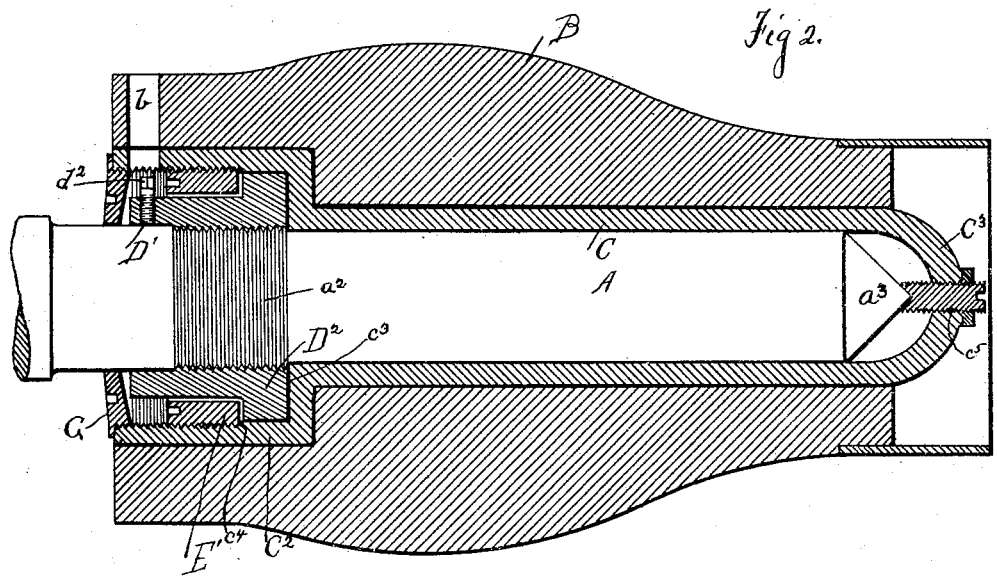
Figure 3:
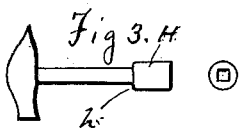

The invention is illustrated in the accompanying drawings as follows:

Figures 1 and 4 show the invention in its preferred form, wherein it is arranged for a ball-bearing. Figs. 2 and 5 show the invention adapted to a box-and-spindle bearing. Fig. 3 shows the wrench H for operating the set-nut.

A marks the axle, B the hub, and C the hub-box.

The axle, as shown in Fig. 1, is provided with a cone end $a$, having, preferably, the curved ball-surface $a'$. A cup $C'$ is screwed onto the end of the box and is provided with the ball-surface $c$ in opposition to the ball-surface $a'$. The balls F are interposed between the surfaces to form the ball-bearing. A ball-retainer lug $c'$ extends inwardly from the end of the cup and is of sufficient size and shape to form with the end of the box a cage for the balls, so that they are retained in place regardless of the presence of the axle. The end of the axle is coned, as shown, and a cup-screw $c^2$ is screwed through the cup $C'$ to a position in close proximity to the cone at the end of the axle. By removing this screw $c^2$ oil may be introduced, and, if desired, the screw $c^2$ may be turned into contact with the cone end of the axle, so as to relieve the balls to some extent of the end thrust of the bearing.

The box has the enlargement $C^2$ at the inner end, which forms a shoulder $c^3$. The axle has at this end the screw-thread $a^2$, and onto this thread is screwed the nut D. The nut is provided with the cone end $d$, on which is the ball-surface $d'$. The thread $a^2$ may be made a sufficiently tight fit in the nut D to lock the nut against moving when in use; but I prefer providing the set-screw $D'$, which is screwed through the rear end of the nut D against the axle, thus locking the nut D in place. The set-screw is provided with a squared end $d^2$, and a socket-wrench (shown in Fig. 3) is provided to operate the set-screw. It is brought into engagement by inserting it through the opening $b$ in the hub. If desired, the wrench may be left in the opening and in engagement with the set-screw. In Figs. 1 and 4 the set-screw is so proportioned in length as to bring the shoulder $h$ of the wrench just through the opening $b$, when the set-screw $D'$ is loosened from the axle, as shown in Fig. 4. When the wheel is turned in either direction, this shoulder prevents the wrench from falling out, and the wrench being in engagement with the set-screw, which is secured in the nut D, turns the nut D with the wheel, so that the nut D may be screwed on or off by rotating the wheel. I prefer that the length of the set-screw should be such that it may be screwed back into the opening $b$, as shown in Fig. 5, without being screwed out of the nut D, so that the engagement between the hub and the nut may be effected by the set-screw alone, in which case the wrench may be withdrawn, if desired, and the turning of the nut D be effected by the engagement of the set-screw $D'$ with the walls of the opening $b$. In Fig. 2 the set-screw is so proportioned in length that a very slight outward movement will bring its outer end into the opening $b$, as shown in Fig. 5. It will be noted in this connection that when the set-screw is turned out so as to be in engagement with the walls of the opening $b$ either through the intermedium of the wrench, as shown in Fig. 4, or directly, as shown in Fig. 5, it forms a means in the wheel for disengaging the axle-nut for the axle, and in the construction shown this means acts by locking the axle-nut with the wheel, so that the axle-nut may be unscrewed by a movement of the wheel. A nut E is screwed into the enlargement $C^2$ and is set against the shoulder $c^4$. It is provided with the cup end $e$, on which is the ball-surface $e'$, opposing the surface $d'$ on the cone $d$. Balls F' are interposed between the surfaces.

It will readily be seen that the nut D acts in opposition to the nut E to hold the box in place on the axle and that as it is screwed inwardly the balls F' are crowded against the cup $e$ in the nut E, and this tends to draw the box bodily inward, so as to bring the surface $c$ in cups C' against the balls F, so that the net result of screwing the nut D inwardly is to tighten both bearings, and, vice versa, screwing the nut outwardly loosens the bearings. It will also be noted that the ball-bearing at the outer end is an end-thrust bearing as well as a straight bearing and that its adjustment is effected by an axial movement of the box on the axle.

It will appear, further, that when the nut E is in place it acts as a flange which, with the shoulder $c^3$, formed by the enlargement $C^2$ of the box, makes a retaining-cavity which retains the nut D in position irrespective of the presence of the axle. The nut D can therefore be screwed entirely off the thread $a^2$ and the hub removed without causing the dislocation of the balls and the nut D, and when the hub is replaced the nut is in position to engage the thread $a^2$. It will be readily understood also that the screwing on and off of the nut D is accomplished by simply bringing the set-screw D' into the opening $b$ and then turning the wheel. Thus to remove the wheel the operation is to first loosen the set-screw D'. This loosens the nut D from the axle and at the same time locks the nut D with the hub. The wheel is then turned to unscrew the nut D and remove it. To replace the wheel, it is simply placed on the axle and turned to screw on the nut D to a position which will properly adjust the bearings. The set-screw D' is then turned down to set it against the axle, and this operation releases the set-screw from the hub and leaves the wheel free to turn on the bearing. It will be noted, therefore, that the nut D is attached to and disengaged from the axle while being retained in the retaining-cavity formed by the shoulder $c^3$ and the nut E and that its adjustment on the axle is also accomplished while it is within this retaining-cavity.

A dust-cap G is screwed into the enlargement $C^2$ of the box and closes as nearly as practical the bearing. A spring-cap (not shown) may, if desired, be provided for the opening.

It will be readily understood that the ball-surface may be reversed—that is, the cups may be formed on the axle and the cones secured to the box. I prefer the arrangement shown, however.

In Figs. 2 and 5 I show an alternative construction wherein the retaining and adjusting features are adapted to a spindle-and-box bearing. In this construction A marks the axle, C the axle-box, and B the hub. The box is closed at its outer end, forming the integral cap $C^3$. The axle ends in a cone $a^3$, on which operates a cup-screw $c^5$. The box C has the enlargement $C^2$, as in the construction shown in Fig. 1, but preferably not quite so pronounced, and forms at the point of enlargement the shoulder $c^3$. The nut $D^2$ is screwed onto the screw-threads $a^2$ on the axle. The nut E' is screwed into the enlargement $C^2$ against a shoulder $c^4$. The hub is provided with an opening $b$, as in Fig. 1, and a set-screw D' is screwed into the rear part of the nut $D^2$ against the axle in the same manner and for the same purpose as is the set-screw D' in the construction shown in Fig. 1. A dust-cap G is screwed into the end of the enlargement $C^2$. It will be noted that in this construction the nut $D^2$ acts in opposition to the nut E' to hold the box in place on the axle and that the nut E', in connection with the shoulder $c^3$, forms a retaining-cavity in which the nut $D^2$ is retained while detached from the axle and while being adjusted upon the axle, and that the set-screw D' when brought into the opening $b$ forms a means in the wheel through the instrumentality of which the nut $D^2$ may be disengaged from the axle, and that this means acts in the construction shown by locking the nut $D^2$ with the wheel, so that a movement of the wheel effects a movement of the nut.

What I claim as new is—

1. In a vehicle-bearing, the combination of the axle; a box on said axle; ball-bearing at the outer end of the box arranged to be adjusted by an axial movement of the box upon the axle; and means at the inner end of the box for securing the box to the axle and for adjusting it longitudinally on the axle.

2. In a vehicle-bearing, the combination of the axle having a coned end, a box on the axle, a cone-screw secured in the end of the box counter to the coned end of the axle; and means at the inner end of the box for securing the box to the axle.

3. In a vehicle-bearing, the combination of the axle having a ball-bearing cone at its outer end; a box on said axle; a ball-bearing cup secured to said box and arranged oppositely to said cone, said cup being provided with the ball-retaining lug, $c'$.

4. In a vehicle-bearing, the combination of the axle; a box on said axle; a nut secured to said box at its inner end; and a nut secured to the axle and arranged to act in opposition to the nut on the box and to secure the box on the axle, said nut having an extension extending within and inwardly beyond the nut in the box whereby the exposed inner end may be engaged to remove the nut from the axle.

5. In a vehicle-bearing, the combination of the axle; a box on said axle; a nut secured to said box at its inner end; a nut secured to the axle; and arranged to act in opposition to the nut on the box, and to secure the box on the axle; and means in the wheel for disengaging the axle-nut from the axle.

6. In a vehicle-bearing the combination of the axle having a screw-thread, $a^2$, a box on said axle; a nut secured to said box at its inner end; a nut screwed onto the axle-threads, $a^2$, and arranged to act in opposition to the nut on the box to secure the box on the axle; and means for locking the axle-nut with the wheel.

7. In a vehicle-bearing, the combination of the axle; a box on the axle having the enlargement, $C^2$; a nut secured to said box within said enlargement; and a nut secured to the axle, and arranged to act in opposition to the nut on the box to secure the box on the axle; and means in the wheel for disengaging the axle-nut from the axle.

8. In a vehicle-bearing, the combination of the axle; a box on said axle having an enlargement at its inner end, forming a shoulder at the point of enlargement; a flange arranged oppositely to the shoulder, formed by the enlargement to make a retaining-cavity between it and said shoulder; and a nut in said retaining-cavity arranged to be secured to and detached from the axle while retained in said cavity.

9. In a vehicle-bearing, the combination of the axle; a box on said axle having an enlargement at its inner end, forming a shoulder at the point of enlargement; a flange arranged oppositely to the shoulder, formed by the enlargement to make a retaining-cavity between it and said shoulder; a nut in said retaining-cavity arranged to be secured to and detached from the axle while retained in said cavity; and means in the wheel for disengaging the nut from the axle.

10. In a vehicle-bearing, the combination of the axle having the screw-thread, $a^2$, thereon; the box on the axle having the opening, $b$, therein; a nut, D, screwed on the axle and arranged to secure the box on the axle; and a set-screw, D', arranged to lock the nut and to be brought into register with the opening, $b$.

11. In a vehicle-bearing, the combination of the axle having a screw-thread thereon; the box on the axle; a nut screwed on the screw-thread and arranged to secure the box on the axle; and a set-screw for locking the nut with the axle, which screw is arranged to form a means through which said nut may be locked with the box for the purpose set forth.

12. In a vehicle-bearing, the combination of the axle; the box having the enlargement, $C^2$ forming the shoulder $c^3$; a nut having a ball-bearing surface and being detachably secured to the axle and arranged within the enlargement of the box; a nut secured to the box of the enlargement, and having a ball-bearing surface at the axle-nut, and arranged to form with a shoulder, $c^3$, a nut-retaining cavity in which are held the axle-nut and balls when detached from the axle; and balls interposed between said nuts.

13. In a vehicle-bearing, the combination of the axle; the box having the enlargement, $C^2$ forming the shoulder $c^3$; a nut having a ball-bearing surface, and being detachably secured to the axle and arranged within the enlargement of the box; a nut secured to the box at the enlargement, and having a ball-bearing surface in opposition to the ball-bearing surface of the axle-nut, and arranged to form with a shoulder, $c^3$, a nut-retaining cavity in which are held the axle-nut and balls when detached from the axle; balls interposed between said nuts; and means in the wheel for disengaging the axle-nut from the axle.

14. In a vehicle-bearing, the combination of the axle; the box having the enlargement, $C^2$, forming the shoulder, $c^3$; a nut having a ball-bearing surface, and being screwed on the axle, and arranged within the enlargement of the box; a nut secured to the box at the enlargement, and having a ball-bearing surface in opposition to the ball-bearing surface on the axle-nut, and arranged to form with a shoulder, $c^3$, a nut-retaining cavity in which are held the axle-nut and balls when detached from the axle; and balls interposed between said nuts.

15. In a vehicle-bearing, the combination of the axle; the box having the enlargement, $C^2$ forming the shoulder, $c^3$; a nut having a ball-bearing surface, and being screwed on the axle, and arranged within the enlargement of the box; a nut secured to the box at the enlargement, and having a ball-bearing surface in opposition to the ball-bearing surface on the axle-nut; and arranged to form with a shoulder, $c^3$, a nut-retaining cavity in which are held the axle-nut and balls when detached from the axle; balls interposed between said nuts and means for locking said nut with the wheel for the purposes described.

16. In a vehicle-bearing, the combination of the axle; a box on said axle having an enlargement, $C^2$, forming a shoulder, $c^3$, an end-thrust bearing in said box; a nut detachably secured to the axle and arranged within the enlargement and having a ball-bearing surface; a nut secured to the box at the enlargement, and having a ball-bearing surface in opposition to the ball-bearing surface on the axle-nut, and forming with the shoulder, $c^3$, a nut-retaining cavity for the axle-nut; balls interposed between the nuts; and means for adjusting the nuts to each other and relatively to the end-thrust bearing.

17. In a vehicle-bearing, the combination of the axle; the box provided with the enlargement, $C^2$, at the inner end of the box; an end-thrust bearing in said box at the outer end of the axle, the nut, D, having the cone end, $d$, screwed on the axle; the nut, E, having cup end, $e$, screwed in the enlargement; and the balls, F'.

In testimony whereof I affix my signature in presence of two witnesses.

JOHN W. CHAMBERS.

Witnesses:
W. I. SCHRYVER,
H. E. PADDOCK.